United States Patent [19]

Whiteley

[11] 3,999,092
[45] Dec. 21, 1976

[54] PERMANENT MAGNET SYNCHRONOUS DYNAMOELECTRIC MACHINE

[75] Inventor: Eric Whiteley, Peterborough, Canada

[73] Assignee: Canadian General Electric Company, Limited, Toronto, Canada

[22] Filed: Mar. 10, 1975

[21] Appl. No.: 556,995

[30] Foreign Application Priority Data

Apr. 4, 1974 Canada .................. 196860

[52] U.S. Cl. .................. 310/156; 310/114; 310/126; 310/268
[51] Int. Cl.² .................. H02K 21/12
[58] Field of Search .......... 310/156, 152, 268, 114, 310/126, 162–165

[56] References Cited
UNITED STATES PATENTS

| | | | |
|---|---|---|---|
| 2,897,387 | 7/1959 | Welter .................. | 310/268 |
| 3,215,876 | 11/1965 | Nichols et al. .................. | 310/156 |
| 3,230,406 | 1/1966 | Henry-Baudot .................. | 310/268 X |
| 3,324,321 | 6/1967 | Kober .................. | 310/156 |
| 3,348,086 | 10/1967 | Monma .................. | 310/268 |
| 3,428,840 | 2/1969 | Kober .................. | 310/268 X |
| 3,482,131 | 12/1969 | Lytle .................. | 310/268 X |
| 3,539,817 | 11/1970 | Darrieus .................. | 310/268 |
| 3,678,314 | 7/1972 | Carter .................. | 310/268 |
| 3,790,835 | 2/1974 | Takeda .................. | 310/268 |
| 3,845,339 | 10/1974 | Merkle .................. | 310/156 |

*Primary Examiner*—Donovan F. Duggan
*Attorney, Agent, or Firm*—Vale P. Myles

[57] ABSTRACT

An axial gap synchronous dynamoelectric machine consists essentially of a disc-shaped rotor having axially oriented permanent magnet pole bodies with faces lying in an annular surface; a stator core spaced axially from the pole faces; and a discoidal AC winding linked with the pole bodies and the core. The winding consists of a plurality of coils laid overlapping in an annular array and bonded together with a resinous material into a unitary structure having an annular disc portion containing the coil sides and inner and outer ring portions containing the coil end-heads. It is supported by the stator with its disc portion in the space between the stator core and the pole faces, and its disc portion is spaced axially from the pole faces.

11 Claims, 5 Drawing Figures

PERMANENT MAGNET SYNCHRONOUS DYNAMOELECTRIC MACHINE

BACKGROUND OF THE INVENTION

This invention relates to synchronous dynamoelectric machines having relatively rotatable discoidal components including an AC winding and a plurality of permanent magnet poles.

SUMMARY OF THE INVENTION

A synchronous machine according to the invention has at least two relatively rotatable disc-like components. One component incorporates an annular array of spaced permanent magnet pole bodies which are oriented magnetically in an axial direction and have pole faces lying in an annular surface. These magnets produce a steady state magnetic field of alternate north and south polarity linked with an alternating magnetic field produced by an AC winding which consists of a plurality of coils laid overlapping in a flat annular pattern and bonded together by means of a resinous material. This results in a discoidal winding structure having an annular disc portion containing the coil sides and inner and outer ring portions containing the coil end-heads. The winding structure is supported by the other component with one side of its disc portion adjacent the faces of the pole bodies. The machine also includes magnetic means on the one component linked magnetically with the pole bodies, and other magnetic means located on the other side of the winding disc portion and linked magnetically with the winding, these magnetic means providing flux paths for the pole bodies and the winding.

DESCRIPTION OF THE DRAWINGS

Two embodiments of the invention will now be described in more detail with reference to the accompanying drawings, in which.

DETAILED DESCRIPTION

Figure 1:
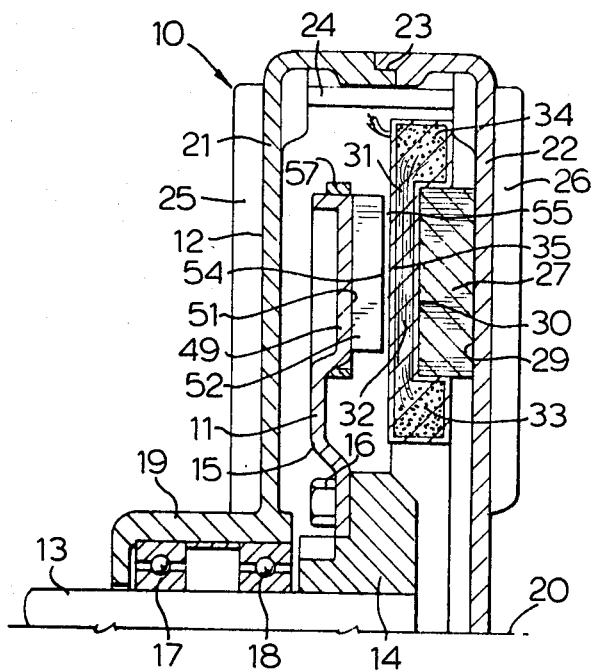
FIG. 1 is a view in section of a synchronous machine constructed according to the invention.

The synchronous machine 10 illustrated in FIG. 1 has a rotor 11 supported for rotation inside a stator housing 12. The rotor consists of a shaft 13, a hub 14 secured to the shaft and a disc-shaped member 15 secured to the hub by means of a number of screws 16. Member 15 is part of a permanent magnetic field structure which will be described later. Two ball bearings 17 and 18 having their inner races secured to shaft 13 and their outer races retained in a housing cup 19, support the rotor for rotation on its axis 20.

Housing 12 consists of two dish-shaped members 21 and 22 formed with alignment means 23 on their peripheries and held together in assembled relation by means of a number of tie rods 24, or through bolts. Member 21 includes the bearing retaining cup 19 and a number of external heat dissipating fins 25. Member 22 includes similar fins 26.

Figure 3:
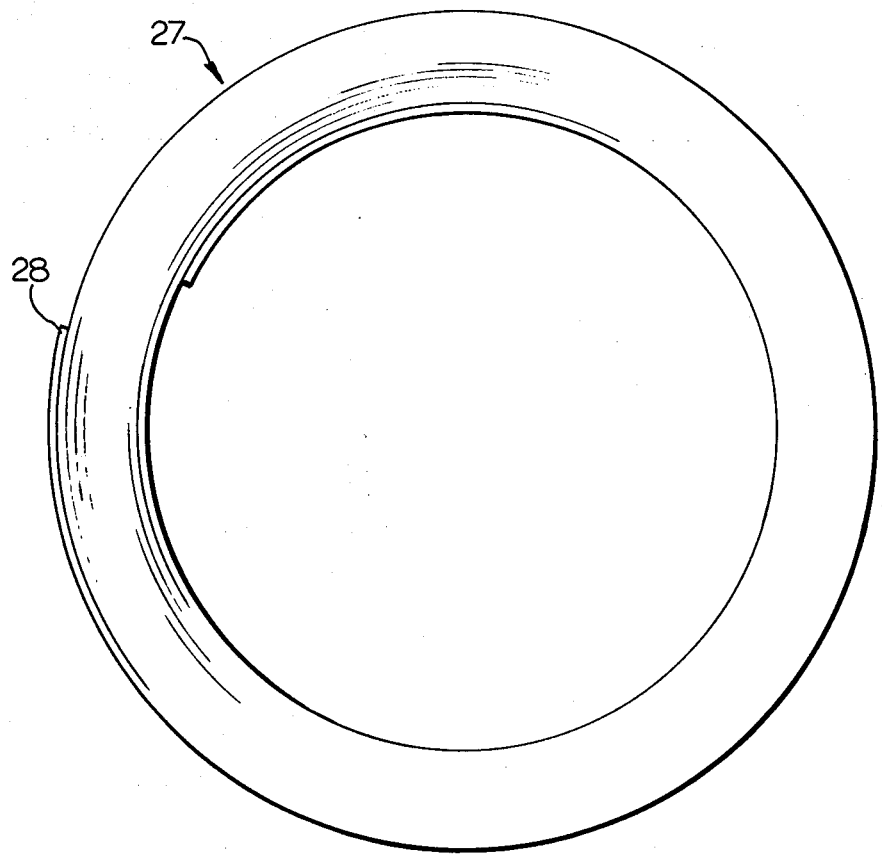
FIG. 3 is a view of the magnetic core used in the stator of the machine shown in FIG. 1.

An annular laminated magnetic core 27 is secured to the inside surface of housing member 22 coaxial with axis 20. This core, as shown in FIG. 3, may be a strip of magnetic steel 28 of uniform width wound spirally into a compact coil of annular configuration. One edge of the strip forms a flat surface 29 which abuts a flat surface on member 22. The core may be welded to the housing member or secured to it in some other way such as bonding with an epoxy resin. This core has another flat surface 30 normal to axis 20.

A discoidal winding structure 31 having an annular disc portion 32 and inner and outer ring portions 33 and 34 respectively is carried by the core with the flat disc portion resting against surface 30 and the ring portions overhanging the curved surfaces of the core. The exposed side 35 of the disc portion presents a flat surface normal to axis 20. Winding structure 31 may be secured to core 27 by a film of epoxy resin between the winding structure and the core. This winding consists essentially of an annular array of overlapping coils interconnected as an alternating current winding and bonded together in a unitary discoidal structure by means of a bonding medium such as an epoxy resin.

Figure 2:
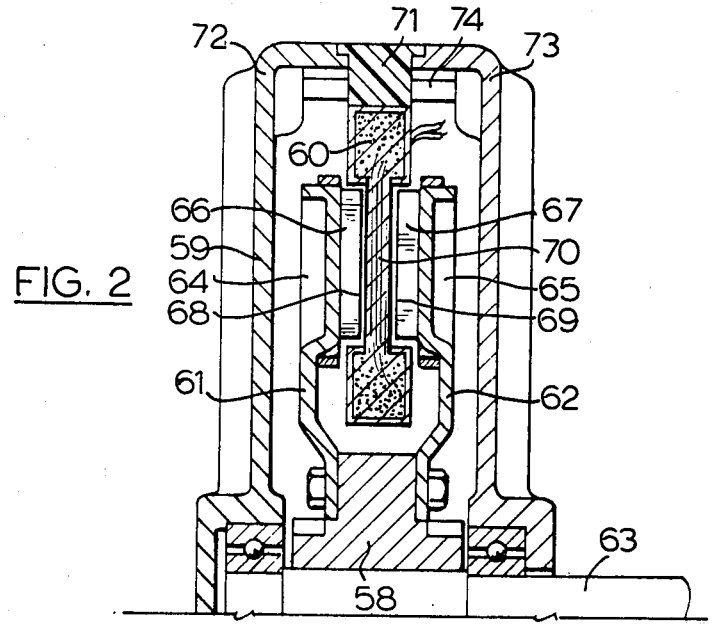
FIG. 2 is a view in section of another version of a synchronous machine constructed according to the invention.
Figure 4:
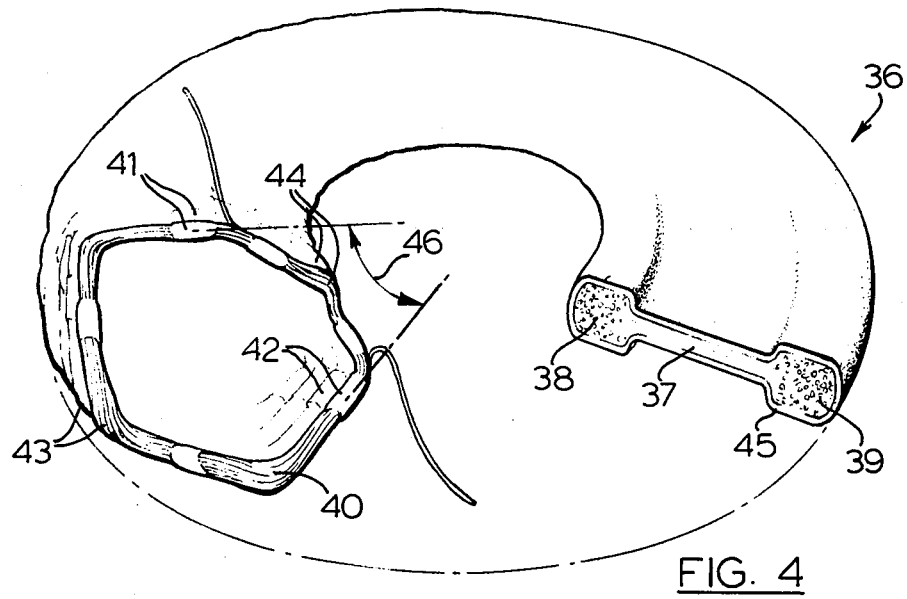
FIG. 4 is a view in perspective of a discoidal winding structure suitable for use in synchronous machines constructed according to the invention.

In FIG. 4 there is shown a discoidal winding structure 36 of a type suitable for use in the machine illustrated in FIG. 2 and readily adapted for use in the machine illustrated in FIG. 1. This particular winding structure has symmetrical ring portions 38 and 39 rather than the asymmetrical ring portions 33 and 34 shown in FIG. 1; otherwise it is the same structurally and functionally. Winding structure 36 consists essentially of a plurality of multiple turn coils 40 laid in a flat circular array with the coil sides 41 overlapping sides 42 and the outer and inner end-heads 43 and 44 respectively nested together. The coils are identical, as it is possible to make them, and their shape is such that they minimize copper and yet fit well together in a compact winding. The shape and lay of the coils as they appear during the winding operation is clearly shown in FIG. 4. Once the coils are in place in the winding, the sides of the coils are pressed together to a specified coil side thickness and the entire winding is then encapsulated in a resinous material 45, such as an epoxy resin that will flow between the conductors. The resin may be reinforced with glass fibers in selected regions to improve the encapsulated structure. The resulting product is a discoidal winding structure of electrical conductors bonded together by means of a resinous material. This structure is rigid and strong enough to be self-supporting in the machine of FIG. 2 under operating conditions; however, when it is attached to a stator core as in FIG. 1, it may be somewhat less robust. The resin bonded winding structure is in the configuration of an annular disc portion 37 located between enlarged inner and outer ring portions 38, 39 respectively, and the three portions are coaxial. Disc portion 37 is relatively thin and contains the sides 41, 42 of coils 40, the sides being radial and at a span 46 of approximately one pole pitch, a pole pitch being the span between two adjacent poles of the machine as indicated at 47 in FIG. 5. Heads 43 on the diverging ends of the sides are located in the outer ring portion 39 and heads 44 on the converging ends of the sides are located in the inner ring portion 38. Winding structures of this nature are described in more detail in Canadian application, Ser. No. 188,535, filed Dec. 19, 1973, Eric Whiteley (also filed as U.S. patent application Ser. No. 534,058, on Dec. 19, 1974).

Figure 5:
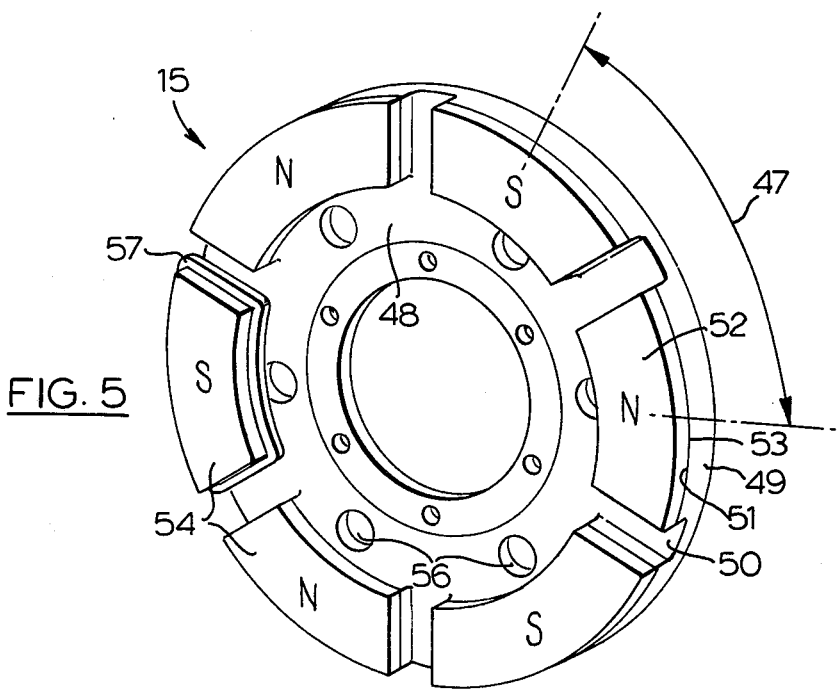
FIG. 5 is a view in perspective of a permanent magnet field structure suitable for use in synchronous machines constructed according to the invention.

The disc-shaped member 15 of rotor 11 is made of a good magnetic material such as a mild steel. In FIGS. 1 and 5, it is shown as an annular member 48 formed with six portions 49 offset from the plane of the disc toward the winding structure. Portions 49 are spaced equally apart as indicated at 50 in FIG. 5, are spaced equally from axis 20, and have flat outer surfaces 51 lying in a plane normal to axis 20. The rotor is provided with a permanent magnet 52 for each portion 49. Each magnet is a relatively thin member having two flat and parallel surfaces 53 and 54, of which surface 53 abuts surface 51 and the other surface 54 forms a pole face. Pole faces 54 lie in a plane normal to axis 20, and are spaced axially from the winding surface 35, leaving a narrow gap 55 between them and the winding structure. The magnets may be secured to the rotor structure by means of a film of an adhesive, such as an epoxy resin, or by means of a low temperature brazing alloy between surfaces 51 and 53. As shown in FIG. 5, each magnet and its support appears face on as a sector of an annulus.

For good machine performance, permanent magnets 52 need be of a type capable of producing a strong magnetic field in a rather wide non-magnetic gap, that is, the gap from pole faces 54 to core surface 30 and including gap 55 and winding disc portion 32, and resisting de-magnetization by the alternating magnetic field in this gap from the AC winding. The cobalt-rare earth magnets meet this specification; certain ceramic magnets, such as ferrites, are also suitable for some applications. In very small machines, each magnet 52 will probably be a single permanent magnet unit. However, in the larger machines, each one of the magnets 52 may be a mosaic of unit permanent magnets of the nature described and claimed in the Canadian application, Ser. No. 181,935, filed Sept. 24, 1973, Eric Whiteley (also filed as U.S. patent application Ser. No. 502,007, on Aug. 30, 1974). Magnets 52 are magnetically oriented in a direction substantially parallel to axis 20 and have their pole faces 54 of alternate north and south polarities as indicated in FIG. 5, They may be mounted directly on a flat disc, or if thin as indicated in FIG. 5, on spacers such as the offset portions 49. Because the cobalt-rare earth compounds are expensive the amount of the material used in a magnet is minimized by making the magnet as thin as possible. Portions 49 and the magnets thereon also act as an impeller for driving a cooling medium radially outward between the winding and the rotor during machine operation, the medium returning along the other side of the rotor and through the holes 56 in rotor member 48.

In the machine described above, low reluctance flux paths for the permanent magnet poles are provided as follows: first flux paths are provided by the annular member 48 of the rotor; and second flux paths on the other side of the AC winding 31 are provided by the laminated core 27. The magnetic circuit also includes the high reluctance gap 55 from pole faces 54 to core surface 30 wherein the permanent magnet flux is linked with the conductors of the winding. If the machine is now driven as a generator, this flux linkage with the winding conductors will lead to an alternating emf being induced in the winding; or, if the winding is conducted to a suitable alternating current source, the machine will operate as a synchronous motor. The nature of the alternating current needed for synchronous motor operation is essentially the same as that needed for a conventional synchronous motor.

The machines of FIGS. 1 to 5 may also be provided with an amortisseur winding 57 as is common practice with synchronous machines, and it serves the same purpose in both instances. In the case of a motor, an amortisseur winding is a convenient means for bringing the motor up to synchronous speed, that is, it causes the motor to start in the manner of an induction motor. Annular member 48 functions to some extent as an amortisseur winding for starting purpose, and it may be adequate for light load starting. However, heavy load starting will usually require more in the way of an amortisseur winding. The amortisseur winding illustrated at 57 in FIGS. 1, 2 and 5 is in the form of a conductive collar surrounding each one of the offset portions on the rotor disc.

FIG. 2 shows another version of the type of synchronous machine shown in FIG. 1. This machine has a rotor 58, a stator 59 and an AC winding structure 60. Rotor 58 has two disc-shaped members 61 and 62 which may be attached to one shaft 63, or each member to a separate shaft so that in effect the machine has two rotors. Disc 61 is provided with a plurality of pole structures 64 disposed axially opposite like pole structures 65 on disc 62. Each pole structure 64 includes a permanent magnet 66, or a mosaic of unit permanent magnets, presenting a flat pole face 68, and each pole structure 65 includes a permanent magnet 67, or a mosaic of unit permanent magnets, presenting a flat pole face 69. Pole faces 68 and 69 lie directly opposite each other in spaced relation. The two permanent magnet field structures are essentially the same as the field structure shown in FIG. 1. The polarities of pole structures 64 and 65 are such that they complement each other and the members 61 and 62 complete the magnetic paths because they are made of a magnetic material such as a mild steel.

Winding structure 60 is essentially the structure shown in FIG. 4; it is supported by the stator with its disc portion 70 located between the respective pole faces 68 and 69 spaced therefrom. An annular portin 71 on the periphery of the winding structure is clamped between the stator housing members 72 and 73 by means of a number of tie members 74. Hence, the tie members hold the winding structure and the housing members in assembled relation, the overall assembly being rigid enough that the winding structure remains in place during machine operation.

In the case of the FIG. 1 machine, member 48 is one magnetic means linked magnetically with the pole bodies and core 27 is another, whereby flux paths are provided for the permanent magnets and the winding. In the case of the FIG. 2 machine, core 27 is replaced by another member like 48 and it now serves as the other flux path means as well as adding to the permanent magnet field.

The discoidal winding structure described has the surfaces of its disc portion in parallel planes. This is not necessary; one or both of these surfaces may be the surface of a shallow cone. Moreover, the disc portion of the winding structure need not be uniform in thickness; it may, for example, be thicker at the inner ring portion than at the outer ring portion. In this configurations, the permanent magnet pole faces will, of course, conform with the winding surface in a way that provides the desired flux distribution in the non-magnetic gap. As in the case of conventional synchronous machines, the number of poles used in a machine will depend upon the size and speed of the machine which may be a number other than the six illustrated in FIG. 5.

What is claimed as new and desired to be secured by Letters Patent of the United States is:

1. An axial gap synchronous dynamoelectric machine comprising a pair of structural components supported for relative rotation on a common axis; a plurality of permanent magnet pole bodies on one component oriented magnetic in an axial direction, said pole bodies being spaced apart in an annular array on an axis coinciding with said common axis and said bodies having alternate north and south polarity pole faces lying in an annular surface; an annular array of overlapping coils bonded together by means of a bonding medium to form a unitary discoidal winding structure having an annular disc portion containing the coil sides and inner and outer ring portions containing the coil end-heads, each one of said coils having its sides generally radial and at a coil span of approximately one pole pitch, and said coils being interconnected as an alternating current winding; means for supporting said winding structure on the other structural component with the axis of the winding structure coinciding with said common axis and with one side of the disc portion spaced axially from said pole faces; first magnetic means on said one component linked magnetically with said pole bodies; and second magnetic means located on the other side of said winding disc portion, engaging said means for supporting and linked magnetically with the winding structure, said first and second magnetic means providing flux paths for the pole bodies and the winding.

2. The machine of claim 1 wherein said one structural component is the rotor of the machine and said other structural component is part of the stator of the machine.

3. The machine of claim 2 wherein said rotor is a disc-like member made of a magnetic material and said pole bodies are attached to the member, whereby the member provides the flux paths of said first magnetic means.

4. The machine of claim 3 wherein each one of said pole bodies comprises magnetic structure having a flat surface thereon; and a plurality of flat unit magnets placed edge-to-edge with one side thereof on said surface and bonded thereto, said unit magnets being of uniform thickness, oriented in the same polarity sense, and having their other side form the pole face.

5. The machine of claim 3 wherein said second magnetic means comprises an annular core having a flat surface thereon abutting said other side of said winding disc portion; means for securing said winding structure to said core; and other means for securing said core to said other structural component.

6. The machine of claim 5 wherein said annular core comprises a strip of magnetic steel of uniform width wound into a compact spiral.

7. The machine of claim 1 wherein each one of said pole bodies comprises magnetic structure having a flat surface thereon; and a plurality of flat unit magnets placed edge-to-edge with one side thereof on said surface and bonded thereto, said unit magnets being of uniform thickness, oriented in the same polarity sense, and having their other side form the pole face.

8. An axial gap synchronous dynamoelectric machine comprising a rotor having a disc-like member made of magnetic material and a stator supported for relative rotation on a common axis; a plurality of permanent magnet pole bodies attached to the rotor and oriented magnetically in an axial direction, said pole bodies being spaced in an annular array on an axis coinciding with said common axis and said bodies having alternative north and south polarity pole faces lying in an annular surface; an annular array of overlapping coils bonded together by means of a bonding medium to form a unitary discoidal winding structure having an annular disc portion containing the coil sides and inner and outer ring portions containing the coil end-heads, each one of said coils having its sides generally radial and at a coil span of approximately one pole pitch, and said coils being interconnected as an alternating current winding; means for supporting said winding structure on the stator with the axis of the winding structure coinciding with said common axis and with one side of the disc portion spaced axially from said pole faces; first magnetic means on said rotor linked magnetically with said pole bodies and providing flux paths therefor; and a second magnetic means located on the other side of said winding disc portion and linked magnetically with the winding structure, said second magnetic means comprising a disc-shaped rotor of magnetic material mounted for rotation on said common axis; another plurality of permanent magnet pole bodies on said disc-shaped rotor equal in number to the like said pole bodies, said other pole bodies having their faces located adjacent to said other side of said winding disc portion and axially opposite the respective pole faces lying in said annular surface, and said other pole bodies being axially oriented magnetically for aiding said pole bodies.

9. The machine of claim 8 wherein the two disc rotors are secured to a common shaft for rotation together.

10. The machine of claim 8 wherein the two disc rotors are secured to separate shafts for independent rotation.

11. The machine of claim 8 wherein each one of said pole bodies comprises magnetic structure having a flat surface thereon; and a plurality of flat unit magnets placed edge-to-edge with one side thereof on said surface and bonded thereto, said unit magnets being of uniform thickness, oriented in the same polarity sense, and having their other side form the pole face.

* * * * *